United States Patent
Nagata et al.

(10) Patent No.: US 9,554,343 B2
(45) Date of Patent: Jan. 24, 2017

(54) RADIO COMMUNICATION METHOD, RADIO BASE STATION, USER TERMINAL AND RADIO COMMUNICATION SYSTEM

(71) Applicant: NTT DOCOMO, INC., Tokyo (JP)

(72) Inventors: Satoshi Nagata, Tokyo (JP); Nobuhiko Miki, Tokyo (JP); Mingju Li, Beijing (CN); Liu Liu, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 181 days.

(21) Appl. No.: 14/384,442

(22) PCT Filed: Mar. 11, 2013

(86) PCT No.: PCT/JP2013/056646
§ 371 (c)(1),
(2) Date: Sep. 11, 2014

(87) PCT Pub. No.: WO2013/137194
PCT Pub. Date: Sep. 19, 2013

(65) Prior Publication Data
US 2015/0126237 A1   May 7, 2015

(30) Foreign Application Priority Data

Mar. 16, 2012   (JP) ................. 2012-060640

(51) Int. Cl.
*H04B 7/00*        (2006.01)
*H04W 52/54*       (2009.01)
(Continued)

(52) U.S. Cl.
CPC ........... *H04W 52/54* (2013.01); *H04W 52/143* (2013.01); *H04W 52/226* (2013.01);
(Continued)

(58) Field of Classification Search
CPC .. H04W 52/143; H04W 52/16; H04W 52/226; H04W 52/244; H04W 52/325; H04W 52/54
(Continued)

(56) References Cited

U.S. PATENT DOCUMENTS

2008/0220804 A1* 9/2008 Cho ...................... H04W 52/54
                                                         455/522
2011/0117967 A1* 5/2011 Vedantham ............ H04B 7/024
                                                         455/561

OTHER PUBLICATIONS

Alcatel-Lucent Shanghai Bell, Alcatel-Lucent, Feb. 10, 2012, "Consideration of Signalling Support for Non-Zero Power ABS", 3GPP TSG RAN WG1 Meeting #68 R1-120488.*

(Continued)

*Primary Examiner* — Wesley Kim
*Assistant Examiner* — Raj Chakraborty
(74) *Attorney, Agent, or Firm* — Osha Liang LLP

(57) ABSTRACT

The present invention is designed to report transmit power information of each subframe adequately when a plurality of transmit power are set in a plurality of subframes constituting radio frames. A radio base station performs the steps of setting at least three or more kinds of varying transmit power in a plurality of subframes constituting a radio frame, and also determining a power ratio between a reference signal and a shared data channel signal in each subframe, generating bitmap information that represents a type pattern of transmit power set in the plurality of subframes, reporting the bitmap information and the power ratio to a user terminal and/or another radio base station, and generating the bitmap information with reference to a table in which the power ratio of each subframe and identifiers are associated with each other.

13 Claims, 15 Drawing Sheets

(51) Int. Cl.
| | |
|---|---|
| H04W 52/14 | (2009.01) |
| H04W 52/24 | (2009.01) |
| H04W 52/32 | (2009.01) |
| H04W 52/22 | (2009.01) |
| H04W 52/16 | (2009.01) |
| H04L 5/00 | (2006.01) |

(52) U.S. Cl.
CPC ....... *H04W 52/244* (2013.01); *H04W 52/325* (2013.01); *H04L 5/0048* (2013.01); *H04W 52/16* (2013.01)

(58) Field of Classification Search
USPC .......................................... 455/522
See application file for complete search history.

(56) References Cited

OTHER PUBLICATIONS

Ericsson, ST-Ericsson, Feb. 10, 2012, "Signalling support for reduced non-zero power ABS", 3GPP TSG-RAN WG1 #68 R1-120804.*

Extended Search Report issued in corresponding Application No. 13760792.5, mailed Sep. 17, 2015 (4 pages).

Ericsson et al.; Signalling support for reduced non-zero power ABS: 3GPP TSG-RAN WG1 #68, R1-120804; Dresden, Germany; Feb. 6-10, 2012 (4 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

3GPP TS 36.300 V11.0.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11);" Dec. 2011 (194 pages).

Alcatel-Lucent Shanghai Bell et al.; "Consideration of Signalling Support for Non-Zero Power ABS;" 3GPP TSG RAN WG1 Meeting #68, R1-120488; Dresden, Germany; Feb. 6-10, 2012 (3 pages).

International Search Report for corresponding International Application No. PCT/JP2013/056646, mailed Apr. 16, 2013 (2 pages).

Office Action issued in corresponding Japanese Application No. 2012-060640, mailed Mar. 29, 2016 (10 pages).

3GPP TS 36300 V11.1.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Mar. 2012 (194 pages).

\* cited by examiner

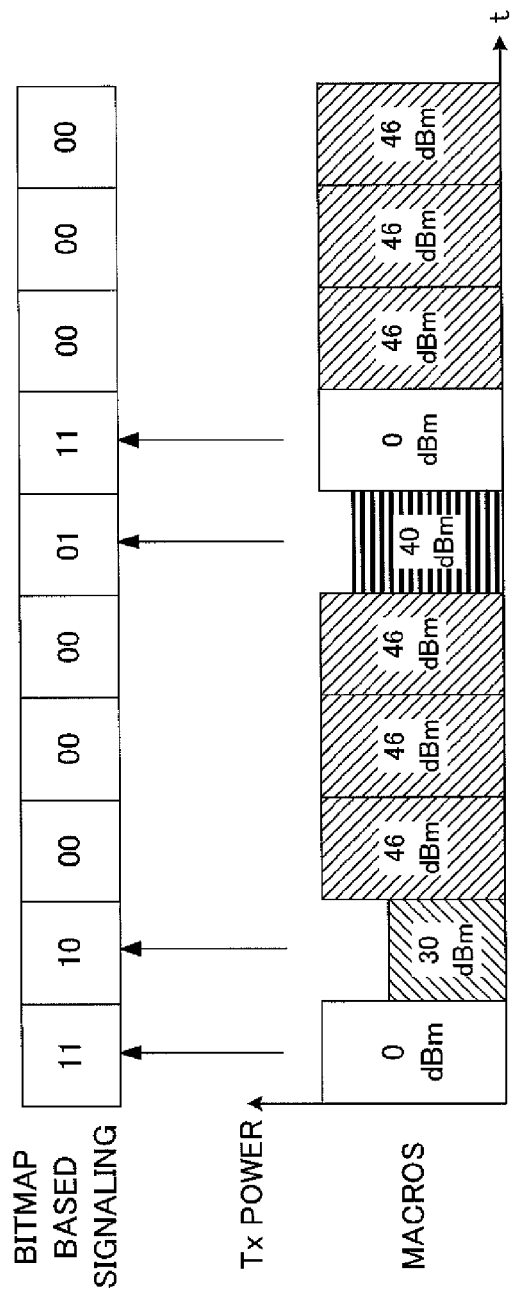

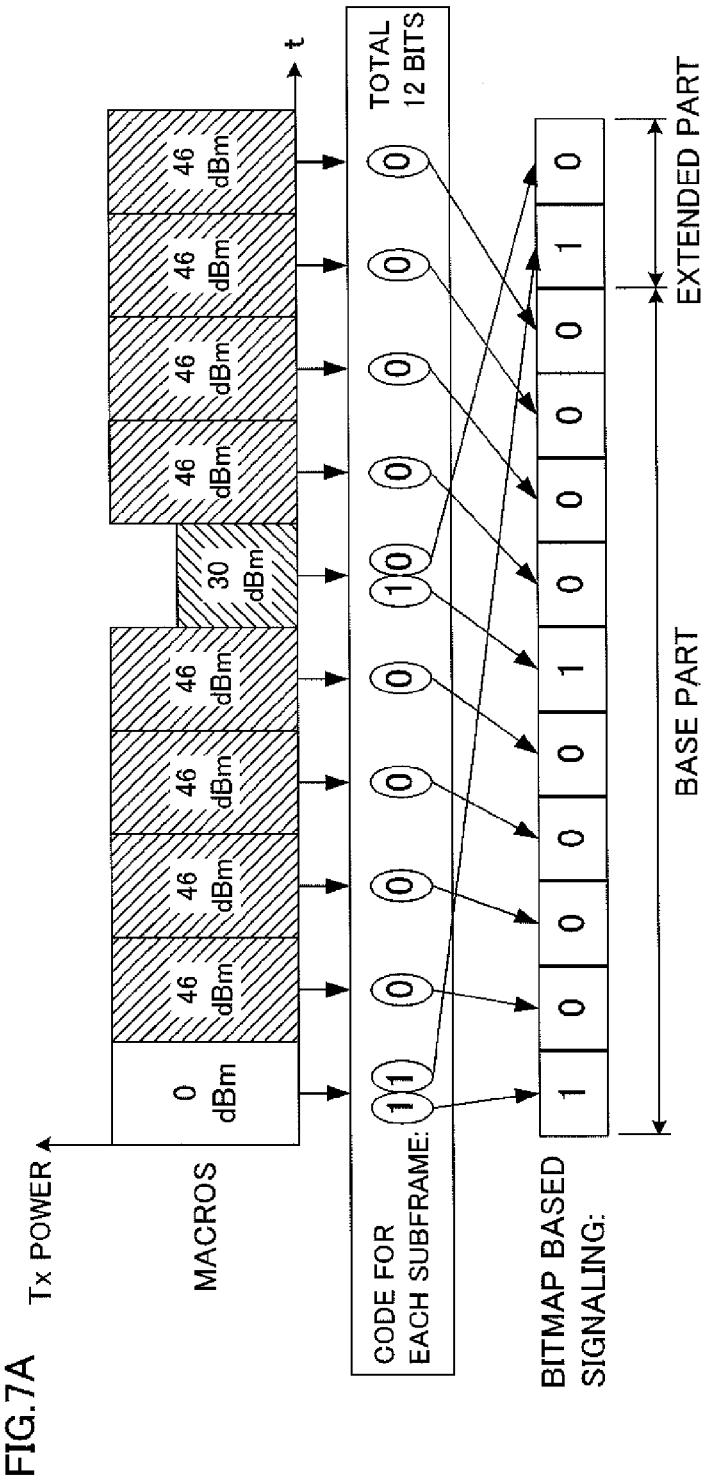

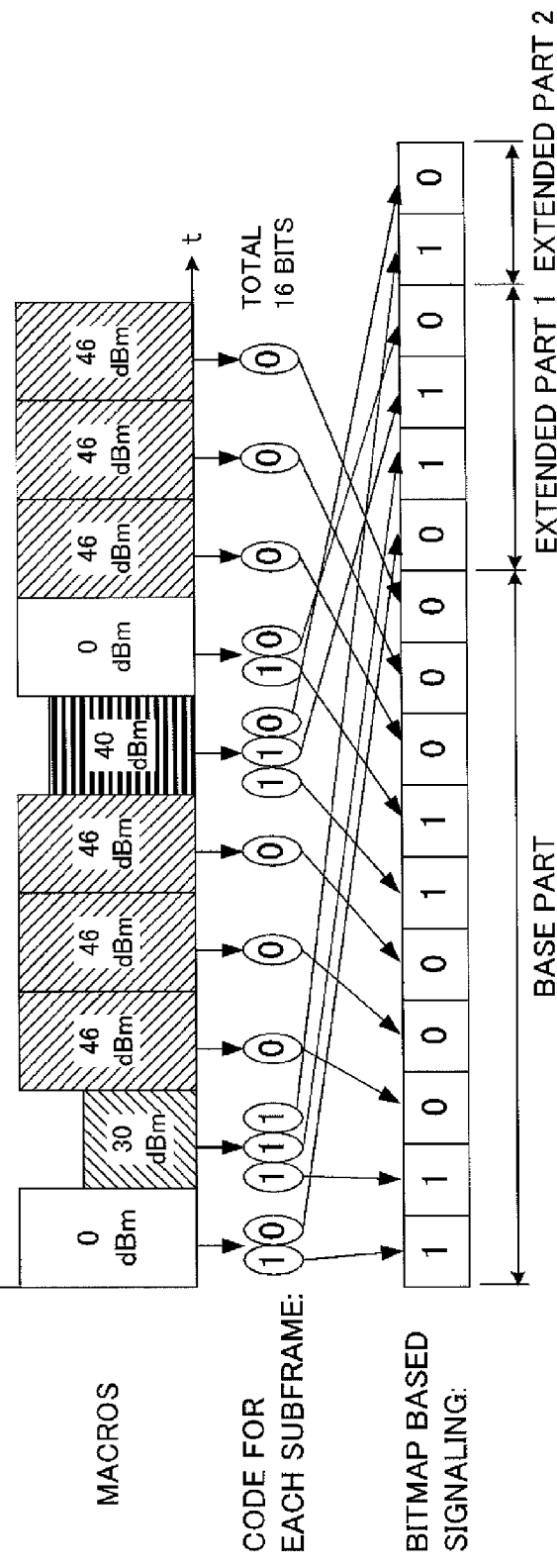

ABS PATTERN

0 : NORMAL SUBFRAME
1 : ABSs

MEASUREMENT RESOURCE 1

MEASUREMENT RESOURCE 2

RADIO COMMUNICATION METHOD, RADIO BASE STATION, USER TERMINAL AND RADIO COMMUNICATION SYSTEM

TECHNICAL FIELD

The present invention relates to a radio communication method, a radio base station, a user terminal and a radio communication system. More particularly, the present invention relates to a radio communication method, a radio base station, a user terminal and a radio communication system to reduce interference between user terminals by interference coordination.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. In relationship to this UMTS network, long-term evolution (LTE) has been agreed upon for the purposes of further increasing high-speed data rates, providing low delay and so on (non-patent literature 1). In LTE, as a multiplexing scheme, OFDMA (Orthogonal Frequency Division Multiple Access), which is different from W-CDMA, is applied to downlink channels (downlink).

In a third-generation system, it is possible to achieve a transmission rate of maximum approximately 2 Mbps on the downlink by using a fixed band of approximately 5 MHz. Meanwhile, in an LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, successor systems of LTE are under study as well (for example, LTE-Advanced (LTE-A)), for the purpose of achieving further broadbandization and higher speed.

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

In Rel-10 LTE, which is one type of LTE-A that has been agreed upon, a heterogeneous network (HetNet) configuration to place significance on the local area environment, in addition to the conventional cellular environment, is employed. Generally, in a layered network like a HetNet, a radio base station (macro base station) of a macro cell covering a relatively wide area sets the downlink transmit power greater than a radio base station of a small cell covering a relatively narrow area (a pico base station, a femto base station, an RRH base station and so on). To reduce interference from a macro base station having such large transmit power against pico base stations, interference coordination techniques are under study.

As one kind of such interference coordination techniques, LTE provides for MBSFN (Multimedia Broadcast multicast service Single Frequency Network) subframe. An MBSFN subframe refers to a subframe where a period which is blank (in which there is no transmission) except for control channels can be provided. As a time-domain interference coordination technique in a HetNet configuration, study is in progress to provide subframes (ABSs: Almost Blank Subframes) that serve as non-transmit power periods, in radio frames transmitted from a macro base station, by utilizing MBSFN subframes, and allocate the radio resources of the ABS periods to user terminals located near the cell edges of small cells. By allocating the radio resources of ABS periods to user terminals located near the cell edges of small cells, these user terminals are able to connect with the small cell base stations in a situation where the influence of transmit power from the macro base station is reduced in the ABS periods.

Meanwhile, in Rel-11 LTE, which is one type of LTE-A that is presently under discussion, study is in progress to utilize ABSs, which are subframes set to have no transmit power, by allocating part of transmit power to these ABSs. By utilizing subframes having reduced transmit power like this, it is expected to maintain reduced interference in a layered network like a HetNet and still improve the overall system throughput performance.

On the other hand, when three or more kinds of varying transmit power are set in a plurality of subframes constituting radio resources, it is desirable to adequately report the transmit power information set in each subframe to user terminals and to other radio base stations.

The present invention has been made in view of the above, and it is therefore an object of the present invention to provide a radio communication method, a radio base station, a user terminal and a radio communication system which make it possible to report the transmit power information of each subframe adequately, when a plurality of transmit power are set in a plurality of subframes constituting radio frames.

Solution to Problem

The radio communication method of the present invention includes the steps in which a radio base station sets at least three or more kinds of varying transmit power in a plurality of subframes constituting a radio frame, and also determines a power ratio between a reference signal and a shared data channel signal in each subframe, and generates bitmap information that represents a type pattern of transmit power set in the plurality of subframes, and reports the bitmap information and the power ratio to a user terminal and/or another radio base station, and, in this radio communication method, the bitmap information is generated with reference to a table in which the power ratio of each subframe and identifiers are associated with each other.

Advantageous Effects of Invention

According to the present invention, it is possible to report the transmit power information of each subframe adequately even when a plurality of transmit power are set in a plurality of subframes constituting radio frames.

BRIEF DESCRIPTION OF DRAWINGS

FIG. 6 provides diagrams to explain a case where a first example is applied to a type pattern (ABS pattern) of four kinds of transmit power set in each subframe;

FIG. 7 provides diagrams to explain a case where a second example is applied to a type pattern (ABS pattern) of three kinds of transmit power set in each subframe;

FIG. 8 provides diagrams to explain a case where a second example is applied to a type pattern (ABS pattern) of four kinds of transmit power set in each subframe;

DESCRIPTION OF EMBODIMENTS

The radio communication method, radio base station, user terminal and radio communication system according to the present invention are applicable to LTE/LTE-A systems, which are each one of type of a next-generation radio communication system. First, an overview of a HetNet in LTE/LTE-A systems will be described. Note that, although macro cells and pico cells will be described as examples in the following description, the configuration of the radio communication system is by no means limited to this.

Figure 1:
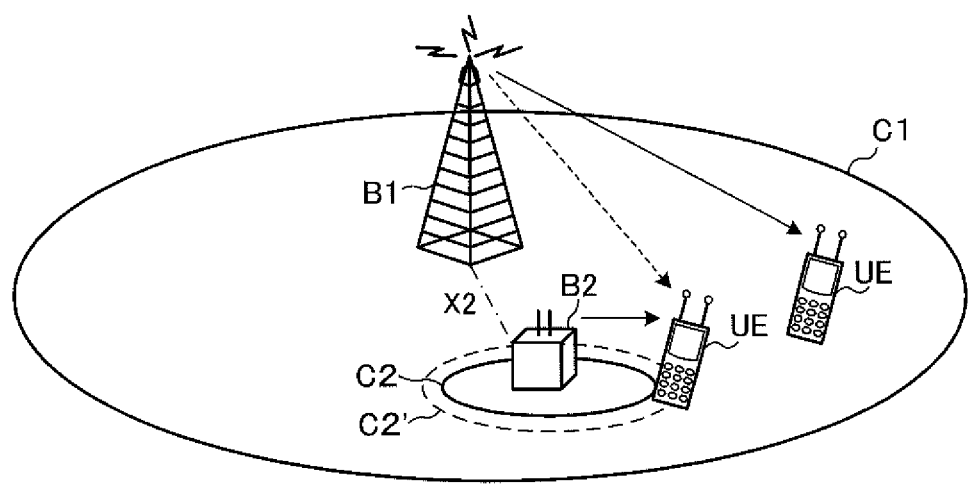
FIG. 1 is a diagram to explain an overview of a heterogeneous network.

FIG. 1 shows an overview of a HetNet. As shown in FIG. 1, a HetNet is a layered network in which, in addition to an existing macro cell C1 (large cell), cells of various formats such as a pico cell C2, a femto cell and so on (small cells) are overlaid. In this HetNet, the radio base station (hereinafter referred to as "macro base station") B1 of the macro cell C1 covering a relatively wide area is configured to have greater downlink transmit power than the radio base station (hereinafter referred to as "pico base station") B2 of the pico cell C2 covering a relatively narrow area. Note that information (timing information, radio resource allocation information such as scheduling, and so on) can be exchanged between the macro base station B1 and the pico base station B2 via wire connection (for example, an X2 interface).

In a layered network like a HetNet, user equipment (hereinafter also referred to as "UE") located at the cell edge of the pico cell C2 is unable to connect with the pico cell C2 despite the fact that it is located close to the pico base station B2. That is, at the cell edge of the pico cell C2, the transmit power of the macro base station B1 is greater than the transmit power of the pico base station B2. As a result of this, the UE located at the cell edge of the pico cell C2 is unable to catch the radio frames from the pico base station B2 of the pica cell C2, and connects with the macro cell C1 by catching the radio frames from the macro base station B1 having greater transmit power. This means that the area originally belonging to the pico cell C2 is invaded by the macro base station B1 and becomes smaller.

So, in a HetNet, connecting user terminal UEs that are located at cell edges of the pico base station B2 to the pico base station B2 by executing CRE (Cell Range Expansion) is under study. With CRE in a HetNet, the cell range of the pico base station B2 is expanded to a cell C2' by applying an offset value to the received power from the pico base station B2, and user terminal UEs located at cell edges of the cell C2 are connected to the pico base station B2. By this means, it is possible to expand the coverage of the pico base station B2 of low transmit power, and more user terminal UEs can connect with the pico base station B2. However, since the transmit power of the macro base station B1 is greater than the transmit power of the pico base station B2, interference from the macro base station B1 against user terminal UEs located on the cell edges of the cell C2 increases.

As an interference coordination technique for reducing the interference from the macro base station B1 against the pico base station, use of MBSFN subframes, which are standardized in LTE, may be possible. To be more specific, as a time-domain interference coordination technique in a HetNet configuration, study is in progress to provide subframes (ABSs) that serve as non-transmit power periods in radio frames transmitted from the macro base station B1, and allocate the radio resources of the ABS periods to user terminals located near the cell edges of the pico cell C2, by utilizing MBSFN subframes. As noted above, by allocating the radio resources of ABS periods to a UE located near the cell edge of the pico cell C2, this UE is able to connect with the pico cell C2 without being influenced by the transmit power from the macro base station B1 in the ABS periods.

Figure 2:
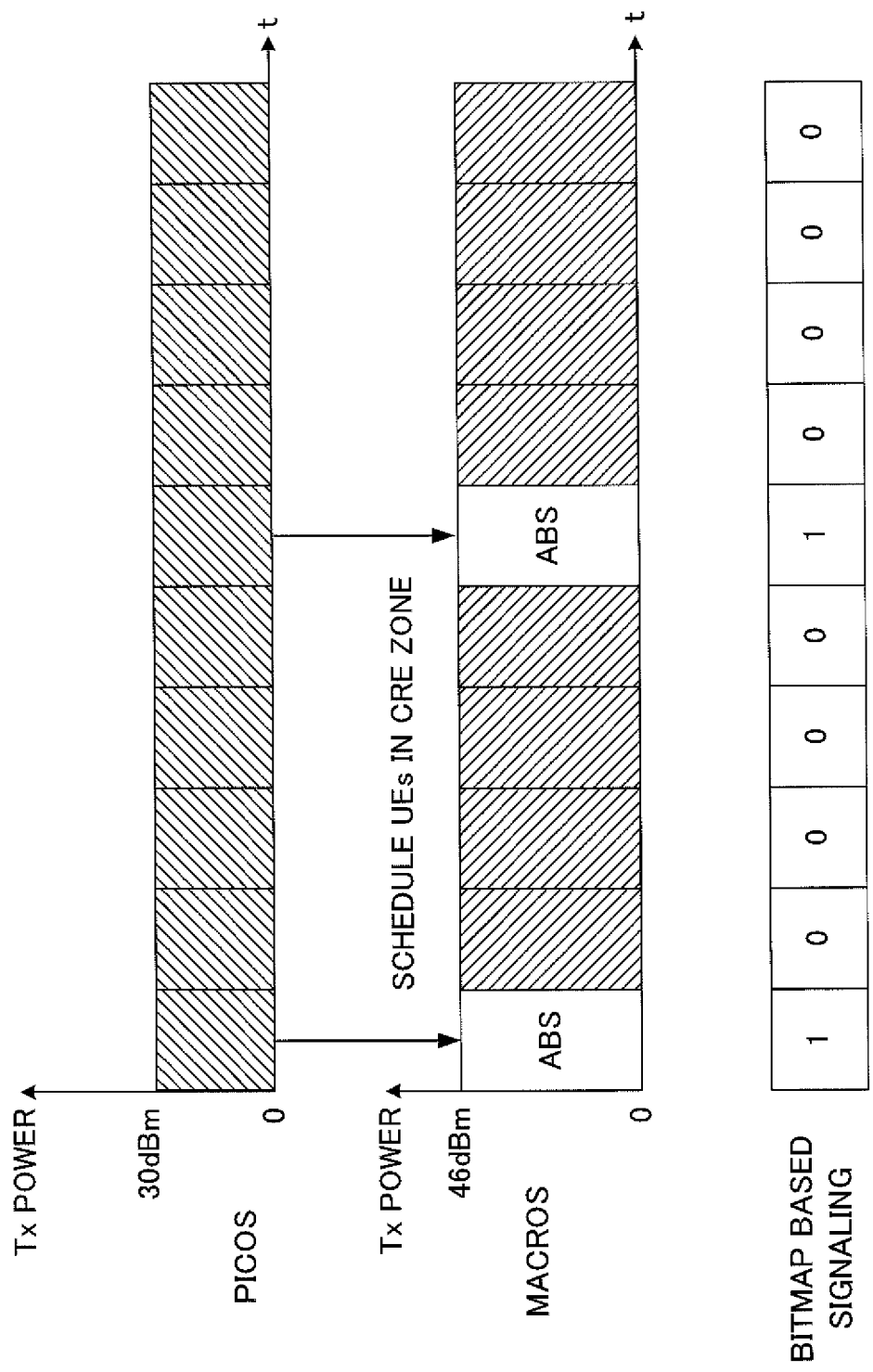
FIG. 2 is a diagram to show a type pattern (ABS pattern) of two kinds of transmit power set in each subframe.

FIG. 2 is a diagram to show the transmit power set in each of a plurality of subframes constituting radio frames in the pico cell C2 and the macro cell C1. Note that the transmit power here corresponds to the power of a downlink shared data channel (PDSCH: Physical Downlink Shared Channel) set in each subframe.

When an ABS is applied to LTE-A, a radio frame in the macro cell C1 is formed with subframes (with transmit power of 46 dBm, for example) that are configured as normal subframes, and subframes (with transmit power of 0 dBm, for example) that are configured as ABSs. Meanwhile, a radio frame in the pico cell C2 is formed with subframes (with transmit power of 30 dBm, for example) that are configured as normal subframes.

In the radio frame shown in FIG. 2, given ten subframes, the macro base station B1 sets the first subframe and the sixth subframe as ABSs, and sets the rest of the subframes as normal subframes. The pico base station B2 allocates radio resources to user terminals located near the cell edges of the pico cell C2 in the first subframe and the sixth subframe where ABSs are set.

The macro base station B1 reports the type pattern of transmit power to be set in a plurality of subframes—to be more specific, information (ABS pattern) about the subframes where ABSs are set—to other base stations (for example, the pico base station B2). For example, the macro base station B1 generates bit map information, which represents the type pattern (ABS pattern) of transmit power set in a predetermined period (a 40-ms period (40 subframes)), and signals this to the pico base station.

For example, in the bitmap information, subframes that are configured as ABSs are defined with "1," and subframes that are configured as normal subframes are defined with "0." In this case, the types of subframes (normal subframes or ABSs) set in each subframe can be represented by one bit, so that, in the case where signaling is carried out in 40-subframe units, the bitmap information is formed with 40 bits.

In the case shown in FIG. 2 (10 subframes), the first subframe and the sixth subframe are configured as ABSs, so that the macro base station B1 reports the ABS pattern to the pica base station B2 by applying bitmap information formed with "1000010000." Based on the ABS pattern received, the pico base station B2 sets predetermined subframes for measuring channel quality (CQI: Channel Quality Indicator), for UEs connected with the pico base station B2.

Now, a CRS (Cell-specific Reference Signal), which is a reference signal that is common between cells, is set in each subframe. A CRS is used to demodulate data channel signals, and, besides, used to measure downlink channel quality (CQI) for scheduling and adaptive control, and estimate the average downlink propagation path state (mobility measurement) for cell search and handover.

The transmit power of CRSs that are transmitted in each subframe is set at the same level as the transmit power of normal subframes (to be more specific, the transmit power of the PDSCH allocated in normal subframes), even in subframes where ABSs are allocated. This is because a UE has to measure the reference signal received power (RSRP) for handover and so on, even in subframes where ABSs are allocated.

In LTE-A (Rel-10 LTE), the PDSCH is allocated only in normal subframes and is not allocated in ABSs. Consequently, a UE is required to demodulate the PDSCH only in normal subframes. To demodulate the PDSCH, the UE needs to know the ratio of the transmit power of the PDSCH to the transmit power of CRSs (hereinafter referred to as "PDSCH/CRS power ratio" or simply "power ratio"). This PDSCH/CRS power ratio is reported to the UE through higher layer signaling, allowing the UE to demodulate the PDSCH adequately.

Figure 3:
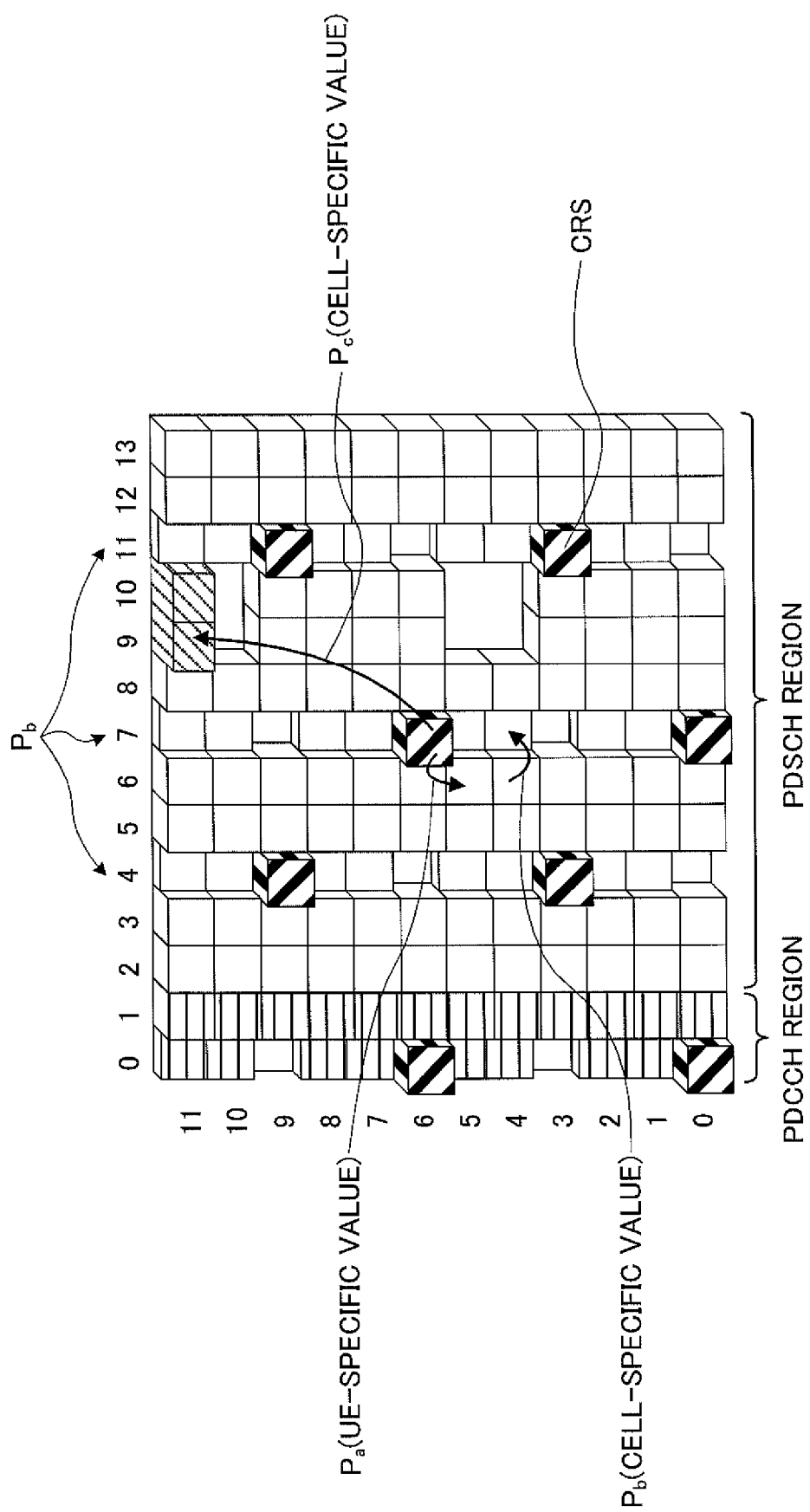
FIG. 3 is a diagram to explain the power ratio between a reference signal and a shared data channel signal in each subframe.

To be more specific, as the ratios of the PDSCH transmit power to the CRS transmit power, Pa and Pb are used as shown in FIG. 3. Pa is defined as the power ratio between the PDSCH in one resource element in symbols where CRSs are not allocated and the CRS. Pb is defined as the power ratio between the PDSCH in one resource element in symbols where CRSs are allocated, and the PDSCH in one resource element in symbols where CRSs are not allocated.

In this way, when two kinds of transmit power are set in a plurality of subframes (when normal subframes and ABSs are set), the macro base station B1 reports the ABS pattern to the pico base station and also reports the CRS transmit power, Pa and Pb to user terminals. Also, based on the ABS pattern, the pico base station B2 sets predetermined subframes for CQI measurement, for a UE connected with the pico base station B2. Then, the user terminal connecting with the pico base station measures the received quality of subframes (normal subframes and ABSs) specified by the pico base station B2, and sends a feedback to the pico base station B2. Also, the user terminal connecting with the macro base station B1 demodulates the PDSCH based on the power ratio in normal subframes.

Meanwhile, in LTE-A (Rel-11 LTE), study is in progress to tolerate allocating lower transmit power than that of normal subframes to ABSs that are set as non-transmit power periods, and arrange a PDSCH with reduced transmit power. Subframes like this, in which a PDSCH with reduced transmit power is arranged in ABSs, may be referred to as "reduced-power ABSs" (or "non-zero transmit power ABSs"). That is, in LTE-A (Rel-11 LTE), the PDSCH is transmitted not only in normal subframes but is also transmitted in reduced-power ABSs as well.

Figure 4:
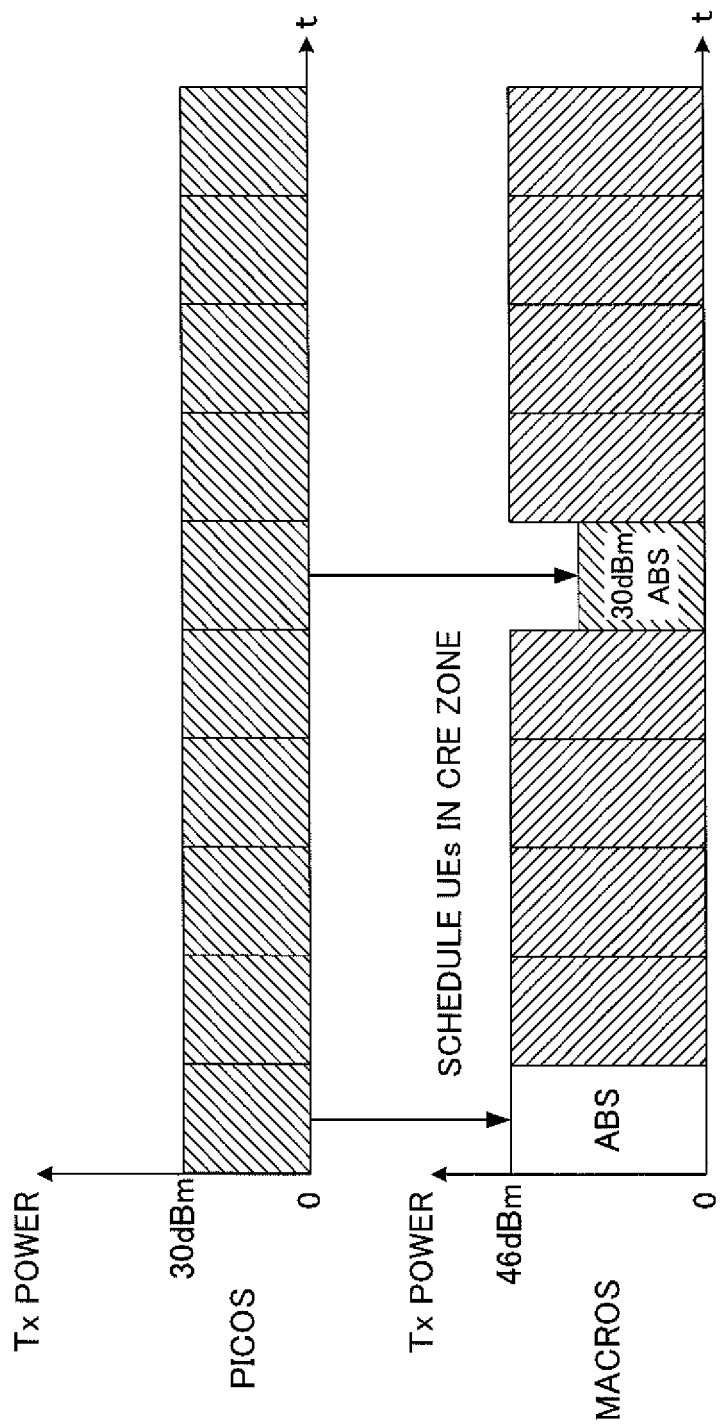
FIG. 4 is a diagram to show a type pattern (ABS pattern) of three kinds of transmit power set in each subframe.

FIG. 4 shows a case where three kinds of transmit power are set in a plurality of subframes constituting radio frames (here, 10 subframes) in the macro cell C1. To be more specific, a case is illustrated here where radio frames are formed with subframes (with transmit power of 46 dBm, for example) that are configured as normal subframes, subframes (with transmit power of 0 dBm, for example) that are configured as ABSs, and subframes (with transmit power of 30 dBm, for example) that are configured as reduced-power ABSs. On the other hand, radio frames in the pico cell C2 are formed with subframes (with transmit power of 30 dBm, for example) that are configured as normal subframes.

The radio frames shown in FIG. 4 illustrate a case where the macro base station B1 sets the first subframe as an ABS, sets the sixth subframe as a reduced-power ABS, and sets the rest of the subframes as normal subframes. The pico base station B2 allocates radio resources to the user terminals located near the cell edges of the pico cell C2 (or the user terminals connected by CRE), in the first subframe where an ABS is set and in the sixth subframe where a reduced-power ABS is set.

Also, in the macro cell C1, reduced-power ABSs are allocated a certain level of transmit power, and are used to transmit the PDSCH. Consequently, UEs that are located in the macro cell not only need to demodulate the PDSCH in normal subframes, but also need to demodulate the PDSCH in reduced-power ABSs as well.

Consequently, in addition to the PDSCH/CRS power ratios (for example, Pa and Pb) in normal subframes, it becomes necessary to define PDSCH/CRS power ratios (for example, Pa-1 and Pb-2) in reduced-power ABSs anew, and report these to UEs and pico base stations. Also, the positions (ABS pattern) of subframes where reduced-power ABSs are set need also to be reported to user terminals and pico base stations.

As shown in FIG. 4, when normal subframes, ABSs and reduced-power ABSs are set in a plurality of subframes constituting radio frames, it is necessary to report the type pattern (ABS pattern) of transmit power to be set in subframes, to user terminals and pico base stations adequately.

Also, considering the case where a plurality of reduced-power ABSs of varying transmit power are applied (when setting four or more kinds of transmit power), a method to report the ABS pattern effectively is in demand.

The present inventors have conceived of a method of defining the PDSCH/CRS power ratios of reduced-power ABSs anew and reporting the corresponding relationship between the power ratio in each subframe and the ABS pattern effectively, when setting reduced-power ABSs, and arrived at the present invention. To be more specific, with reference to a table in which the power information (PDSCH/CRS power ratios and so on) and identifiers (codes) to be set in each subframe are associated with each other, bitmap information to represent subframe information (ABS pattern) where ABSs and reduced-power ABSs are set is generated, and this bitmap information and power ratio are reported to user terminals and other radio base stations.

A user terminal is able to calculate the power of the shared data channel signal in each subframe based on the received bitmap information and power ratio, and adequately demodulate the PDSCH which is transmitted in normal subframes and reduced-power ABSs and which has two kinds of transmit power. Furthermore, the user terminal is able to generate channel quality information to feed back to the radio base station.

Now, an example of defining and signaling the corresponding relationship between the power information (CRS power, Pa, Pb and so on) to be set in subframes and the ABS pattern when reduced-power ABSs are set, will be described below.

First Example

With the first example, a case of generating bitmap information of a fixed size to represent the ABS pattern and executing signaling, with reference to a mapping table (hereinafter also referred to as "table") in which subframe power information (power ratios and so on) and identifiers (specific bit values) are associated with each other, will be described. Note that although a case where bitmap information represents ten subframes will be described with the following description as an example, this is by no means limiting. The bitmap information may be generated per predetermined period (for example, per 40 subframes) as well.

Figures 5A, 5B:
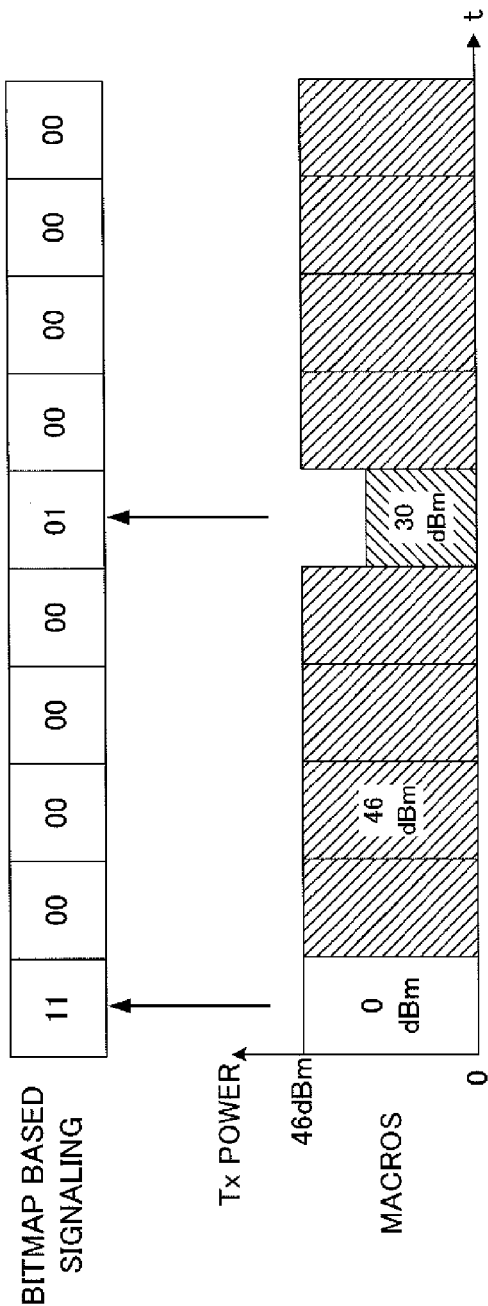
FIG. 5 provides diagrams to explain a case where a first example is applied to a type pattern (ABS pattern) of three kinds of transmit power set in each subframe.

FIG. 5A shows a case where, in a macro cell, radio frames are formed with normal subframes (with transmit power of 46 dBm, for example), ABSs (with transmit power of 0 dBm, for example), and reduced-power ABSs (with transmit power of 30 dBm, for example). Also, FIG. 5A shows an example of bitmap information, which represents the type pattern (ABS pattern) of subframes set as ABSs and reduced-power ABSs constituting radio frames. FIG. 5B shows an example of a table which is referenced when generating bitmap information.

A radio base station (for example, a macro base station) sets the subframes to set as ABSs or reduced-power ABSs, and also determines the transmit power in the reduced-power ABSs. Also, the macro base station determines the power ratio of the reference signal and the shared data channel signal in each subframe. The macro base station is able to determine which subframes in radio frames to set as ABSs (or set as reduced-power ABSs) in accordance with the state (the number of users and so on) of pico base stations which it causes interference to. Also, the macro base station is able to provide subframes where normal subframes, ABSs and reduced-power ABSs are provided on a fixed basis or on a semi-static basis, per predetermined period, in radio frames.

The macro base station allocates the PDSCH to UEs in normal subframes and reduced-power ABSs, and does not allocate the PDSCH in ABSs. Also, the macro base station reports the power information (PDSCH/CRS power ratios per se) in normal subframes and reduced-power ABSs and so on to UEs. For example, the macro base station reports the power information (CRS power, Pa and Pb) in normal subframes and the power information (CRS power, Pa-1 and Pb-1) in reduced-power ABSs to UEs through higher layer signaling. Note that the power value of ABSs can be made 0.

Also, the macro base station generates bitmap information of a fixed size, which represents the ABS pattern, with reference to a mapping table in which power information such as the power ratios between normal subframes, ABSs, reduced-power ABSs and so on, and identifiers (specific bit values) are associated with each other. In the table, for example, as shown in FIG. 5B, specific bit values, each having the same number of bits, are linked to the power ratios of normal subframes, ABSs, and reduced-power ABSs. That is, in the case that three kinds or four kinds of transmit power are set in subframes, each subframe can be identified with two bits.

In the table shown in FIG. 5B, the identifier "00" and the power information (CRS power, Pa and Pb) of normal subframes are associated, the identifier "01" and the power information (CRS power, Pa-1 and Pb-1) of reduced-power ABSs are associated, and the identifier "11" and the power information (CRS power, Pa-2 and Pb-2) of ABSs are associated. Also, the identifiers (specific bit values) defined in the table are directly reflected on the bitmap information.

Note that the macro base station may generate a table after having determined the transmit power to set in subframes, or may generate bitmap information with reference to a mapping table that is prepared in advance. Also, the macro base station reports the table to use to generate bitmap information to UEs and other radio base stations (for example, pico base stations).

The macro base station reports the ABS pattern in the macro cell to UEs and other radio base stations using the bitmap information. Also, the macro base station reports the power ratios set in subframes per se to UEs and other radio base stations. At this time, the macro base station is able to report these pieces of information to UEs via higher layer signaling and to pico base stations via an X2 interface. Note that the reporting method is by no means limited to this, and reporting to UEs may be carried out using, for example, downlink control signals.

FIG. 6 shows a case where, in a macro cell, four kinds of transmit power are set in a plurality of subframes constituting radio frames (here, 10 subframes). FIG. 6A shows a case where radio frames are formed with normal subframes (with transmit power of 46 dBm, for example), ABSs (with transmit power of 0 dBm, for example), first reduced-power ABSs (with transmit power of 40 dBm, for example), and second reduced-power ABSs (with transmit power of 30 dBm, for example). FIG. 6B shows an example of a mapping table to reference when generating bitmap information.

The macro base station determines the subframes to set ABSs or the first and second reduced-power ABSs in, and also determines the power ratios of the first and second reduced-power ABSs. In this case, a UE is allocated the PDSCH in normal subframes and the first and second reduced-power ABSs, and is not allocated the PDSCH in ABSs.

Also, the macro base station reports the power ratios in normal subframes and the first and second reduced-power ABSs to UEs and pico base stations. For example, the macro base station reports the power information (CRS power, Pa and Pb) in normal subframes, the power information (CRS power, Pa-1 and Pb-1) in the first reduced-power ABSs, and the power information (CRS power, Pa-2 and Pb-2) in the second reduced-power ABSs, to UEs through higher layer signaling. Note that the power of ABSs can be made 0.

Also, the macro base station generates a bitmap of a fixed size representing the ABS pattern with reference to a table in which the power ratios of normal subframes, ABSs and the first and second reduced-power ABSs, and identifiers (specific bit values) are associated with each other. As for the table, as shown in FIG. 6B, a table in which the power ratios to be set in subframes and specific bit values are associated with each other may be used.

In the table shown in FIG. 6B, the identifier "00" and the power information (CRS power, Pa and Pb) of normal subframes are associated, the identifier "01" and the power information (CRS power, Pa-1 and Pb-1) of the first reduced-power ABSs are associated, the identifier "10" and the power information (CRS power, Pa-2 and Pb-2) of the second reduced-power ABSs are associated, and the identifier "11" and the power information (CRS power, Pa-3 and Pb-3) of ABSs are associated. With the mapping table shown in FIG. 6B, the power ratios in subframes and specific bit values are linked on a fixed basis, so that the identifiers can be represented with two bits.

The macro base station applies bitmap information and reports the ABS pattern to UEs and other radio base stations. Also, the macro base station reports the power ratios set in subframes per se to UEs and other radio base stations.

In this way, the radio base station generates and signals bitmap information of a fixed size representing the ABS pattern with reference to a table in which the power ratios of normal subframes, ABSs and reduced-power ABSs, and specific bit values are associated with each other, so that it is possible to report the ABS pattern to UEs and other radio base stations adequately. Also, as the radio base station reports the power ratio of each subframe, a UE is able to demodulate the PDSCH adequately even in reduced-power ABSs, and also generate and feed back channel quality information (CQI) adequately. Also, other radio base stations can update CQI information adequately.

Second Example

A case will be described with a second example where bitmap information which has a varying size (the number of constituent bits) in accordance with the number of predetermined subframes (for example, ABSs and reduced-power ABSs) that are set, is generated and signaled with reference to a mapping table in which the power information (power ratios and so on) of subframes and identifiers are associated with each other. Note that although an example with ten subframes will be described with the following description, this is by no means limiting. Bitmap information may be generated per predetermined period (for example, per 40 subframes) as well. Also, in the following description, descriptions of parts that overlap the above first example will be omitted.

FIG. 7A shows a case where, in a macro cell, radio frames are formed with normal subframes (with transmit power of 46 dBm, for example), ABSs (with transmit power of 0 dBm, for example), and reduced-power ABSs (with transmit power of 30 dBm, for example). Also, FIG. 7A shows an example of bitmap information that represents the type pattern (ABS pattern) of subframes that are set as ABSs and reduced-power ABSs constituting radio frames. FIG. 7B shows an example of a table to reference when generating bitmap information.

Also, the radio base station (for example, the macro base station) generates bitmap information that represents the ABS pattern with reference to a table in which the power information (power ratios and so on) of normal subframes, ABSs, and reduced-power ABSs, and identifiers are associated with each other. With the second example, a bit map to change its size in accordance with the number of subframes to be set as predetermined subframes (for example, ABSs, reduced-power ABSs) is generated.

To be more specific, the macro base station provides, as a configuration of bitmap information, a base part, which is defined with the same number of bits as the number of subframes, the ABS pattern of which is reported using bitmap information, and an extended part, which changes its size. Then, the macro base station defines bit values to identify specific power ratios from a plurality of power ratios in the base part, and defines bit values to identify other power ratios in the extended part. For example, bit values to identify normal subframes are defined in the base part, and bit values to identify ABSs and reduced-power ABSs are defined in the extended part. By providing a configuration to identify the subframes (for example, normal subframes) that are set the most in radio frames using the base part, it is possible to reduce the size of bitmap information (the total number of bits).

In FIG. 7A, as bitmap information, the base part is formed with the same number of bits (10 bits) as the number of subframes to constitute radio frames, and the extended part is formed with the number of subframes to be set as ABSs and reduced-power ABSs. In the base part, "0" stands for normal subframes, and "1" stands for subframes other than normal subframes (ABSs and reduced-power ABSs). In the extended part, "1" stands for ABSs, and "0" stands for reduced-power ABSs. That is, the number of bits of the extended part changes with the number of ABSs and reduced-power ABSs that are set. In the case shown in FIG. 7A, the number of ABSs and reduced-power ABSs is two, so that the extended part is formed with two bits, and the total number of bits of bitmap information is 12 bits.

Also, in the table to reference when generating bitmap information, the identifiers can be represented by combining the bit value (one bit) to be set in the base part and the bit value (the number of bits is variable) to be set in the extended part. The identifier to correspond to the subframes that are identified in the base part (for example, normal subframes) is represented with the bit value "0," which is defined in the base part. Then, the identifiers to correspond to ABSs and reduced-power ABSs can be represented with combinations of the bit value "1," which is defined in the base part, and the bit value "0" or "1," which is defined in the extended part.

In this case, normal subframes are identified in the base part, and therefore can be represented with one bit (identifier "0") because the bit value for the extended part is unnecessary. Meanwhile, ABSs and reduced-power ABSs are identified in the extended part, and the identifiers combine the bit value for the base part and the bit value for the extended part. FIG. 7B shows a case where ABSs are represented by the identifier "11," which combines the bit value "1" for the base part and the bit value "1" for the extended part, and reduced-power ABSs are represented by the identifier "10," which combines the bit value "1" for the base part and the bit value "0" for the extended part.

Also, when the kinds of transmit power to be set in subframes increase (for example, when, as shown in FIGS. 8A and 8B, the first and second reduced-power ABSs are set), it is possible to increase the extended part and provide a first extended part and a second extended part. For example, it is possible to identify normal subframes in the base part, identify ABSs in the first extended part, and identify the first and second reduced-power ABSs in the second extended part.

In this way, in a bitmap, by providing a base part that is defined with the same number of bits as the number of subframes, and an extended part that changes, and by identifying the subframes (for example, normal subframes) that are provided the most in the base part and identifying ABSs and others in the extended part, it is possible to reduce the number of bits of bitmap information effectively.

(ABS Pattern Setting)

Figure 9:
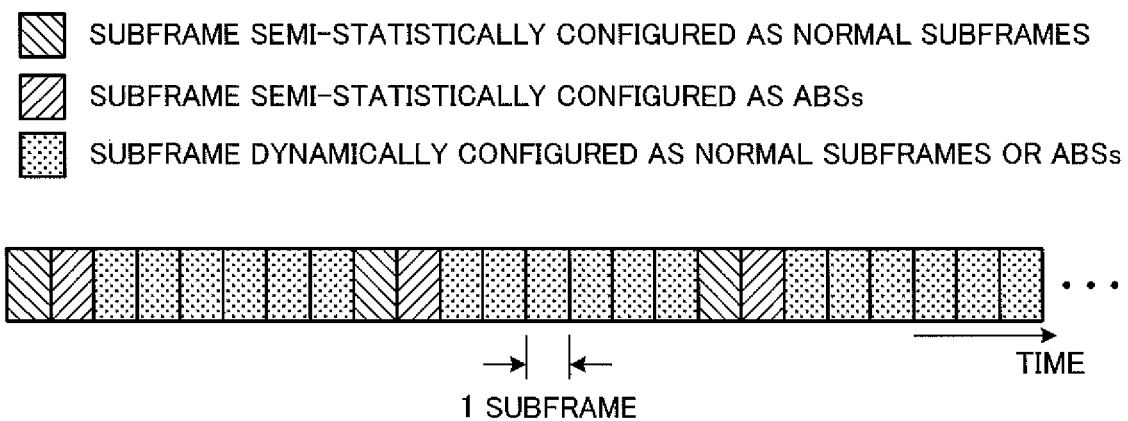
FIG. 9 is a diagram to show examples of subframe types constituting a radio frame.

Next, an example of a method of setting an ABS pattern by a macro base station will be described. FIG. 9 is a diagram to explain of the types of subframes constituting radio frames. When ABSs are applied, for example, it is possible to constitute radio frames with the three kinds of subframes shown in FIG. 9. To be more specific, radio frames can be formed with (1) subframes that are semi-statically set as normal subframes,(2) subframes that are semi-statically set as ABSs (or as reduced-power ABSs), and (3) subframes that are set as normal subframes or as ABSs (or as reduced-power ABSs) on a dynamically switched basis.

In the radio frames shown in FIG. 9, normal subframes and ABSs are set every nine subframes, and normal subframes or ABSs are set in subframes other than these normal subframes and ABSs.

Upon receiving a radio frame like this, a UE needs to measure the received quality of each subframe, and feed back information about the measured channel quality to the radio base station. To allow adequate feedback of channel quality information of normal subframes and ABSs (or reduced-power ABSs), measurement resources 1 and 2, which specify the subframes where received quality should be measured, are reported from the radio base station to the UE. Measurement resource 1 is a bitmap to specify the subframe positions of normal subframes for measuring received quality, and measurement resource 2 is a bitmap to specify the subframe positions of ABSs for measuring received quality. These measurement resources are reported to UEs through higher control signals (for example, through higher layer signaling).

(Operations of UE)

A UE that is in the macro cell demodulates the PDSCH in normal subframes and reduced-power ABSs based on the power information of each subframe (the numerical value of the PDSCH/CRS power ratio and so on) received from the macro base station, and ABS pattern information. In this case, the UE can know the power ratio in each subframe adequately and demodulate the PDSCH with reference to a table having the same contents as the table which is referenced in the macro cell to generate bitmap information.

For example, when bitmap information to represent the ABS pattern shown in FIG. 5A is reported to a UE, the UE references the mapping table shown in FIG. 5B and learns that the first subframe is an ABS, the second to fifth and the seventh to tenth subframes are normal subframes (Pa and Pb), and the fifth subframe is a reduced-power ABS (Pa-1 and Pb-1).

Then, the UE calculates the transmit power (the CRS power×Pa or the CRS power×Pa×Pb) of the PDSCH in normal subframes, and calculates the transmit power (the CRS power×Pa-1 or the CRS power×Pa-1×Pb-1) of the PDSCH in reduced-power ABSs, and demodulates the PDSCH in each subframe. Note that the PDSCH/CRS power ratios per se in normal subframes and reduced-power ABSs (the numerical values of power ratios) can be reported from the macro base station to the pico base stations and UEs in advance, apart from the bitmap representing the ABS pattern.

Also, a UE measures the received quality of each subframe and feeds back information about the measured channel quality to the base station. In this case, the UE receives measurement resources 1 and 2 that specify the subframes where received quality should be measured, from the radio base station. In the UE, channel quality information in normal subframes and reduced-power ABSs can be determined based on the power information of each subframe (Pa, Pb, Pa-1 and Pb-1). For example, in normal subframes, channel quality information may be determined based on Pa or Pa×Pb, and, in reduced-power ABSs, channel quality information may be determined based on Pa-1 or Pa-1×Pb-1.

(Operations of Other Radio Base Stations)

As described above, when varying transmit power is set in each subframe, the radio base station reports measurement resources 1 and 2 that specify the subframes where received quality should be measured, to UEs. Then, the radio base station makes the UEs feed back channel quality information in each subframe.

For example, other radio base stations (pico base stations) determine the subframe pattern to measure channel quality information based on ABS pattern information received from the macro base station and so on.

Figure 10A:
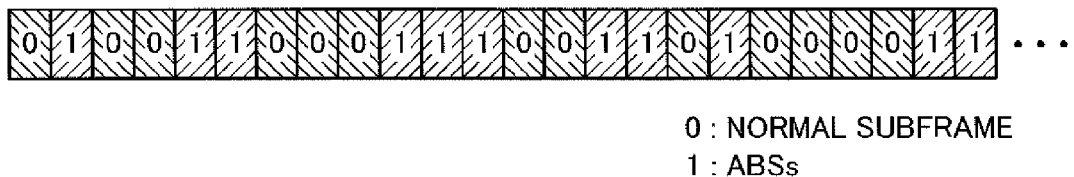
FIG. 10 provides diagrams to explain examples of radio frames where measurement of received quality is commanded in measurement resources.
Figure 10B:
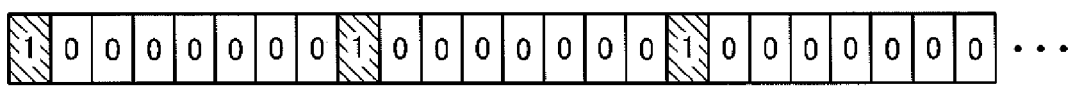
Figure 10C:
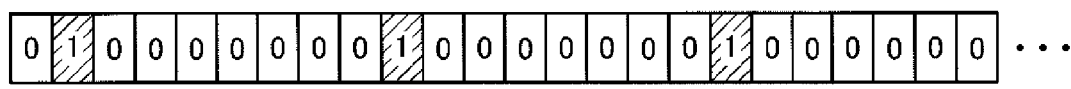

For example, when the ABS pattern reported from the macro base station assumes the configuration shown in FIG. 10A, a pico base station may report the bitmap of measurement resource 1 and the bitmap of measurement resource 2 in the configurations shown in FIGS. 10B and 10C, respectively, to UEs.

As shown in FIG. 10B, in measurement resource 1, "1" is set in the positions of specific normal subframes where quality should be measured, and "0" is set in the other subframe positions. In measurement resource 2, as shown in FIG. 10C, "1" is set in the positions of specific ABSs or reduced-power ABSs where quality should be measured, and "0" is set in the other subframe positions.

In the ABS pattern shown in FIG. 10A, "0" to stand for normal subframes are set in the bit information corresponding to the subframes where measurement of received quality is commanded in measurement resource 1 shown in FIG. 10B (for example, the first, ninth and seventeenth bit information from the leftmost end in FIG. 10A). Also, "1" to stand for ABSs or reduced-power ABSs are set in the bit information corresponding to the subframes where measurement of received quality is commanded in measurement resource 2 shown in FIG. 10C (for example, the second, tenth and eighteenth bit information from the leftmost end in FIG. 10A).

The UE measures received quality in the subframes specified by the pico base station and feeds back information about the measured channel quality to the pico base station. Also, the pico base station receives CQI fed back from the UE and meanwhile recalculates CQI in the pico base station itself and updates information about CQI. At this time, the pico base station takes into account the transmit power of neighboring cells (for example, the macro cell) and calculates CQI in predetermined subframes (normal subframes, ABSs and reduced-power ABSs). Also, the pico base station is able to calculate CQI and update CQI information based on the power ratio of each subframe (normal subframes, ABSs and reduced-power ABSs) received from the macro base station.

(Radio Communication System)

Figure 11:
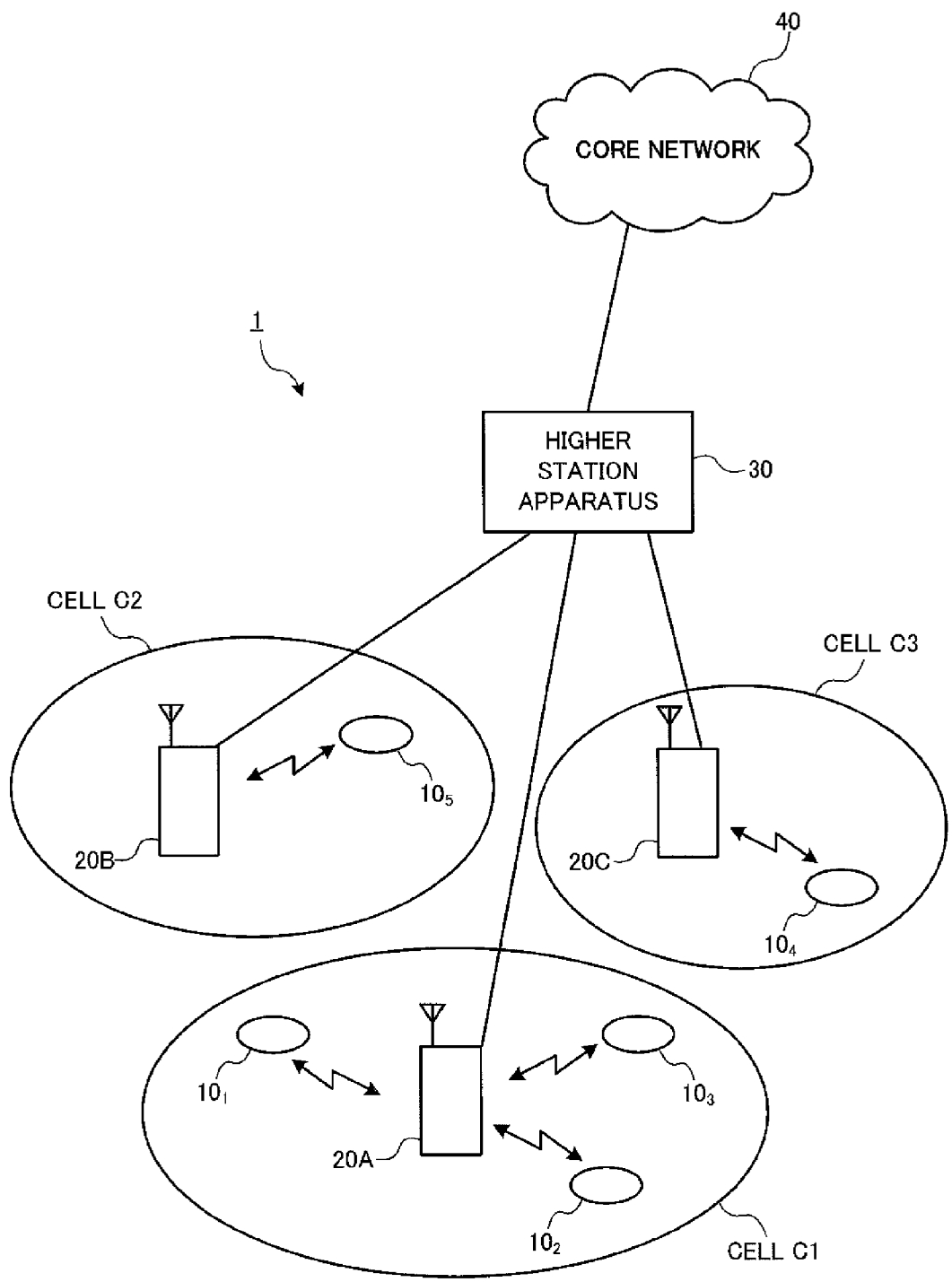
FIG. 11 is a network configuration diagram of a radio communication system.

Now, the radio communication system according to the present embodiment will be described in detail. FIG. 11 is a diagram to explain a system configuration of the radio communication system according to the present embodiment. Note that the radio communication system shown in FIG. 11 is a system to accommodate, for example, an LTE system or SUPER 3G. In this radio communication system, carrier aggregation to group a plurality of fundamental frequency blocks into one, where the system band of the LTE system is one unit, is used. Also, this radio communication system may be referred to as "IMT-Advanced" or may be referred to as "4G."

As shown in FIG. 11, a radio communication system 1 is configured to include radio base stations 20A, 20B and 20C, and a plurality of user terminals 10 ($10_1$, $10_2$, $10_3$, ... $10_n$, where n is an integer to satisfy n>0) that communicate with these radio base stations 20A, 20B and 20C. The radio base stations 20A, 20B and 20C are connected with a higher station apparatus 30, and this higher station apparatus 30 is connected with a core network 40. The user terminals 10 are able to communicate with the radio base stations 20A, 20B and 20C in cells C1, C2 and C3. Note that the higher station apparatus 30 may be, for example, an access gateway apparatus, a radio network controller (RNC), a mobility management entity (MME) and so on, but is by no means limited to these.

The radio communication system 1 according to the present embodiment is applicable to a layered network typified by a HetNet. In a HetNet, for example, the radio base station 20A is a macro base station that has a wide coverage area and high transmit power, and the radio base station 20B is a pico base station that is arranged in the coverage area of the radio base station 20A and has lower transmit power and a smaller coverage area than the macro base station.

The user terminals ($10_1$, $10_2$, $10_3$, ... $10_n$) may be either LTE terminals or LTE-A terminals, but the following description will be given simply with respect to user terminals 10, unless specified otherwise. Also, although the user terminals 10 will be described to perform radio communication with the radio base stations 20A, 20B and 20C for ease of explanation, more generally, mobile terminal apparatuses and fixed terminal apparatuses are included in user terminals.

In the radio communication system 1, as radio access schemes, OFDMA (Orthogonal Frequency Division Multiple Access) is applied to the downlink and SC-FDMA (Single-Carrier Frequency Division Multiple Access) is applied to the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels in the LTE system will be described. Downlink communication channels include a PDSCH, which is a downlink data channel used by each user terminal 10 on a shared basis, and downlink L1/L2 control channels (PDCCH, PCFICH, PHICH). Transmission data and higher control information are transmitted by the PDSCH. Scheduling information for the PDSCH and the PUSCH and so on are transmitted by means of the PDCCH. The number of OFDM symbols to use for the PDCCH is transmitted by the PCFICH (Physical Control Format Indicator Channel). HARQ ACK/NACK for the PUSCH are transmitted by the PHICH (Physical Hybrid-ARQ Indicator Channel).

Uplink communication channels include a PUSCH (Physical Uplink Shared Channel), which is an uplink data channel used by each user terminal on a shared basis, and a PUCCH (Physical Uplink Control Channel), which is an uplink control channel. By means of this PUSCH, transmission data and higher control information are transmitted. Also, by the PUCCH, CSI, which is received quality information to use reference signals (CSI-RSs and CRSs), downlink radio quality information (CQI: Channel Quality Indicator), ACK/NACK and so on are transmitted.

Figure 12:
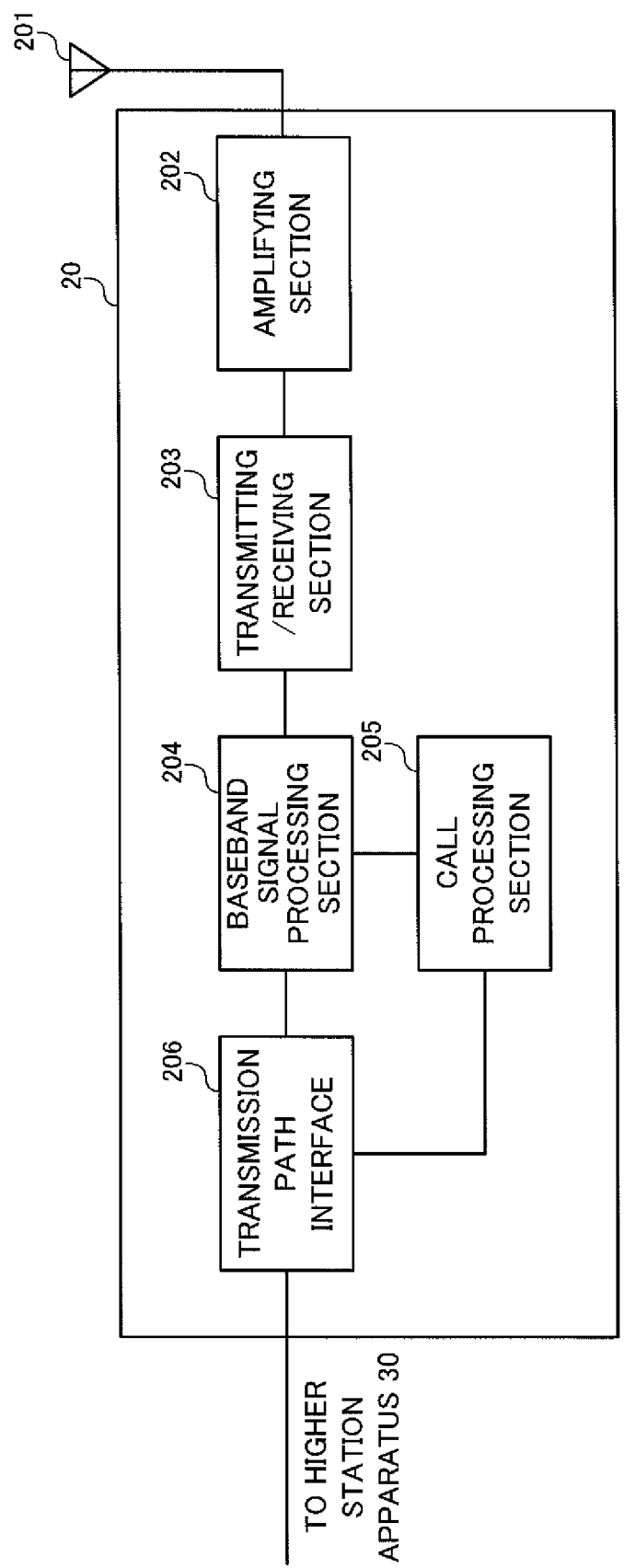
FIG. 12 is a diagram to explain an overall configuration of a radio base station.

An overall configuration of the radio base station 20 according to the present embodiment will be described with reference to FIG. 12. Note that the radio base stations 20A (for example, a macro base station), 20B (for example, a pico base station) and 20C all have the same configurations and therefore will be described simply as "radio base station 20." The radio base station 20 has a transmitting/receiving antenna 201, an amplifying section 202, a transmitting/receiving section (reporting section) 203, a baseband signal processing section 204, a call processing section 205, and a transmission path interface 206. Transmission data to be transmitted from the radio base station 20 to the user terminal 10 on the downlink is input from the higher station apparatus 30 into the baseband signal processing section 204 via the transmission path interface 206.

In the baseband signal processing section 204, a signal of a downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, as for a signal of a physical downlink control channel, which is a downlink control channel, transmission processes such as channel coding and an inverse fast Fourier transform are performed.

Also, the baseband signal processing section 204 reports control information for allowing each user terminal 10 to perform radio communication with the radio base station 20, to the user terminals 10 connected to the same cell, by a broadcast channel. The broadcast information for communication in the cell includes, for example, the uplink or downlink system bandwidth, root sequence identification information (root sequence index) for generating random access preamble signals in the PRACH (Physical Random Access Channel), and so on.

In the transmitting/receiving section 203, a baseband signal that is output from the baseband signal processing section 204 is subjected to frequency conversion into a radio frequency band. The amplifying section 202 amplifies the transmission signal having been subjected to frequency conversion, and outputs the result to the transmitting/receiving antenna 201.

Meanwhile, as for a signal to be transmitted from the user terminal 10 to the radio base station 20 on the uplink, a radio frequency signal that is received in the transmitting/receiving antenna 201 is amplified in the amplifying section 202, converted into a baseband signal through frequency conversion in the transmitting/receiving section 203, and input in the baseband signal processing section 204.

The baseband signal processing section 204 performs an FFT process, an IDFT process, error correction decoding, a MAC retransmission control receiving process, and RLC layer and PDCP layer receiving processes of the transmission data that is included in the baseband signal received on the uplink. The decoded signal is transferred to the higher station apparatus 30 through the transmission path interface 206.

The call processing section 205 performs call processing such as setting up and releasing communication channels, manages the state of the radio base station 20 and manages the radio resources.

Figure 13:
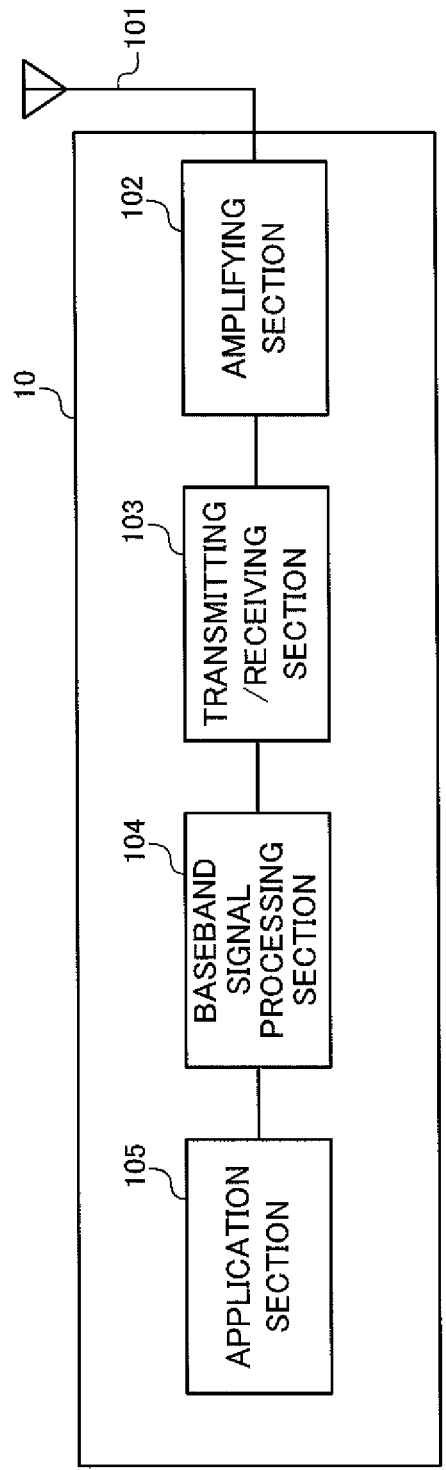
FIG. 13 is a diagram to explain an overall configuration of a user terminal.

Next, an overall configuration of the user terminal 10 according to the present embodiment will be described with reference to FIG. 13. An LTE terminal and an LTE-A terminal have the same hardware configurations in principle parts, and therefore will be described indiscriminately. The user terminal 10 has a transmitting/receiving antenna 101, an amplifying section 102, a transmitting/receiving section (receiving section) 103, a baseband signal processing section 104, and an application section 105.

As for downlink data, a radio frequency signal that is received in the transmitting/receiving antenna 101 is amplified in the amplifying section 102, and converted into a baseband signal through frequency conversion in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. A baseband signal that is output from the baseband signal processing section 104 is converted into a radio frequency band in the transmitting/receiving section 103, and, after that, amplified in the amplifying section 102 and transmitted from the transmitting/receiving antenna 101.

The functional blocks of the baseband signal processing section 204 provided in the radio base station 20 will be described with reference to FIG. 14. Also, the functional blocks shown in FIG. 14 are simplified to explain the present invention, but are assumed to have configurations which a baseband signal processing section provided in a radio base station should normally have.

Figure 14:
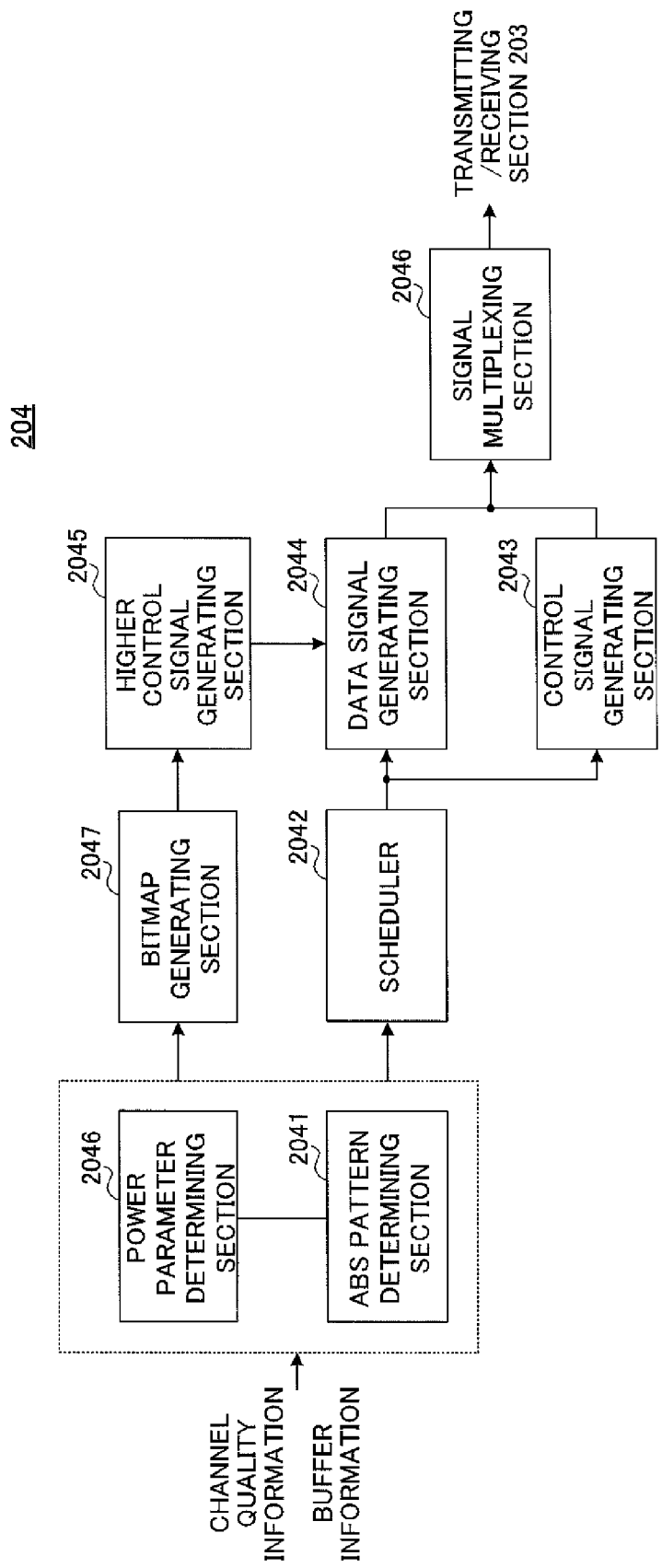
FIG. 14 is a functional block diagram of a baseband signal processing section provided in a radio base station.

As shown in FIG. 14, the baseband signal processing section 204 provided in the radio base station 20 is configured to include an ABS pattern determining section 2041, a power parameter determining section 2046, a bitmap generating section 2047, a scheduler 2042, a control signal generating section 2043, a data signal generating section 2044, a higher control signal generating section 2045, and a signal multiplexing section 2046.

The ABS pattern determining section 2041 determines the ABS pattern. For example, the ABS pattern determining section 2041 determines the power information (for example, the PDSCH/CRS power ratio) in each subframe constituting radio frames. For example, the ABS pattern determining section 2041 sets normal subframes, ABSs and reduced-power ABSs. The ABS pattern determining section 2041 executes control based on signals from neighboring cells and so on. Also, the ABS pattern determining section 2041 is able to determine the ABS pattern in accordance with, for example, channel quality information fed back from each user terminal 10, buffer information that is buffered to transmit to each user terminal 10, and so on.

The power parameter determining section 2046 determines the power ratio of each subframe. For example, the power parameter determining section 2046 determines the power ratios (Pa and Pb) of normal subframes and the power ratios (Pa-1 and Pb-2) of reduced-power ABSs.

The bitmap generating section 2047 generates bitmap information that represents the ABS pattern determined in the ABS pattern determining section 2041. In this case, the bitmap generating section 2047 is able to generate the bitmap information with reference to a table in which the power ratios in subframes and identifiers are associated with each other. Also, the bitmap information has different numbers of bits, depending on the signaling method shown with the above first example or second example.

The scheduler 2042 allocates users in accordance with the ABS pattern determined in the ABS pattern determining section 2041. The control signal generating section 2043 generates a control signal for the user terminal 10, the assignment of which to each subframe has been determined by the scheduler 2042.

The data signal generating section 2044 generates a data signal (PDSCH) for the user terminal 10, the assignment of which to each subframe has been determined by the scheduler 2042. The data signal generated in the data signal generating section 2044 includes higher control signals generated in the higher control signal generating section 2045 (for example, bitmap information to represent the ABS pattern, the power ratios to be set in subframes, measurement resources, and so on).

The higher control signal generating section 2045 generates higher control signals including bitmap information representing the ABS pattern, the power ratios to be set in subframes, and so on. When the above first example is applied, bitmap information of a fixed size is included in the higher control signals. When the above second example is applied, bitmap information to change its size in accordance with the number of ABSs and reduced-power ABSs that are set is included in the higher control signals. The higher control signals generated in the higher control signal generating section 2045 are output to the data signal generating section 2044 and integrated in the data signal (PDSCH).

The signal multiplexing section 2046 generates a transmission signal by multiplexing the control signal generated in the control signal generating section 2043, the data signal generated in the data signal generating section 2044, and a reference signal (for example, CRS) generated in an unillustrated reference signal generating section. The transmission signal generated in the signal multiplexing section 2046 is output to the transmitting/receiving section 203, and transmitted to the user terminal 10 via the amplifying section 202 and the transmitting/receiving antenna 201.

Next, the functional blocks of the baseband signal processing section 104 provided in the user terminal 10 will be described with reference to FIG. 15. Note that the functional blocks shown in FIG. 15 are simplified to explain the present invention, but are assumed to have configurations which a baseband signal processing section provided in a user terminal should normally have.

Figure 15:
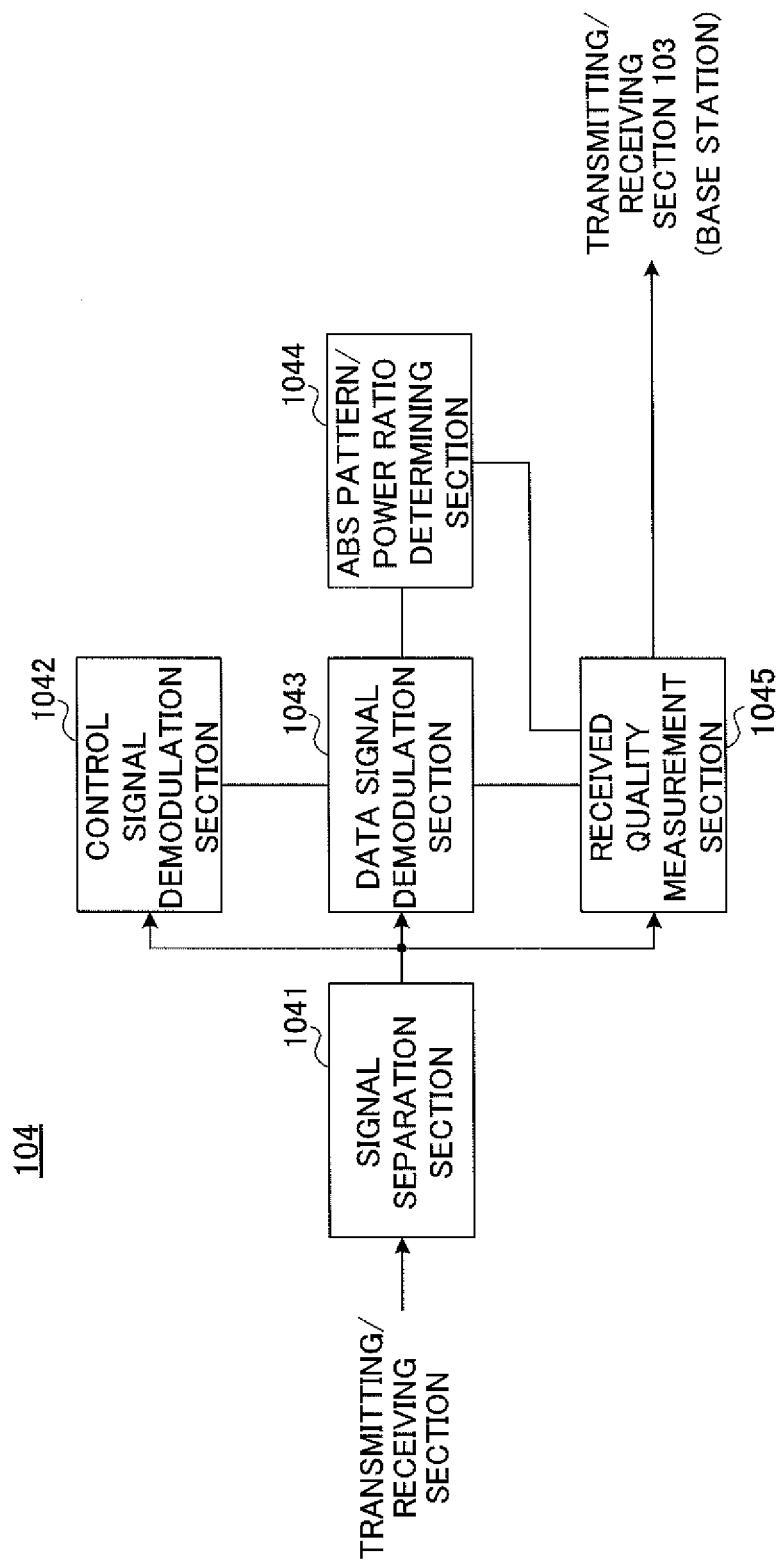
FIG. 15 is a functional block diagram of a baseband signal processing section provided in a user terminal.

As shown in FIG. 15, the baseband signal processing section 104 provided in the user terminal 10 is configured to include a signal separation section 1041, a control signal demodulation section 1042, an ABS pattern/power ratio determining section 1044, a data signal demodulation section 1043, and a received quality measurement section 1045.

The signal separation section 1041 separates a received signal received from the radio base station 20 via the transmitting/receiving section 103, into the control signal, the data signal and the reference signal. The control signal, data signal and reference signal separated in the signal separation section 1041 are output to the control signal demodulation section 1042, the data signal demodulation section 1043 and the received quality measurement section 1045, respectively.

The control signal demodulation section 1042 demodulates the control signal received as input from the signal separation section 1041. Then, the control signal demodulation section 1042 determines whether or not the data signal (PDSCH) for the subject user terminal is allocated, from the demodulated control signal.

The ABS pattern/power ratio determining section 1044 determines the ABS pattern, the power ratio to be set in each subframe and so on, based on bitmap information representing the ABS pattern and power ratios reported in advance from the radio base station through higher control signals. Note that the ABS pattern/power ratio determining section 1044 is able to determine the power ratio set in each subframe from the bitmap information reported in the higher control signal, with reference to a table in which the power ratios set in the subframes and identifiers are associated with each other. The PDSCH/CRS power ratio determined in the ABS pattern/power ratio determining section 1044 is output to the data signal demodulation section 1043.

The data signal demodulation section 1043 demodulates the data signal (PDSCH) allocated in each subframe using the power ratio determined in the ABS pattern/power ratio determining section 1044. By demodulating the data signal in the data signal demodulation section 1043, the transmission signal transmitted from the radio base station 20 is reconstructed. Note that the higher control signal included in the data signal is output to the application section 105.

The received quality measurement section 1045 measures received quality based on the reference signal received as input from the signal separation section 1041. Also, the received quality measurement section 1045 measures received quality (CQI) based on the power ratio of each subframe output from the ABS pattern/power ratio determining section 1044. The received quality measured in the received quality measurement section 1045 is output to the transmitting/receiving section 103, and transmitted (fed back) to the radio base station 20 via the amplifying section 102 and the transmitting/receiving antenna 101.

The present invention is by no means limited to the above embodiment and can be implemented in various modifications. For example, it is possible to implement the method of generating the power ratios to be set in each subframe and the transmission method thereof in the above description with various changes, without departing from the scope of the present invention. Besides, the present invention can be implemented with various changes, without departing from the scope of the present invention.

The disclosure of Japanese Patent Application No. 2012-060640, filed on Mar. 16, 2012, including the specification, drawings and abstract, is incorporated herein by reference in its entirety.

The invention claimed is:

1. A radio communication method comprising the steps in which a radio base station:
   sets at least three or more kinds of varying transmit power in a plurality of subframes constituting a radio frame, and also determines a power ratio between a reference signal and a shared data channel signal in each subframe; and
   generates bitmap information that represents a type pattern of transmit power set in the plurality of subframes; and
   reports the bitmap information and the power ratio to a user terminal and/or another radio base station,
   wherein the bitmap information is generated with reference to a table in which the power ratio of each subframe and identifiers are associated with each other,
   wherein the radio base station sets, as a configuration of the bitmap information, a base part that is formed with the same number of bits as the number of subframes reported using the bitmap information, and an extended part of a variable size.

2. The radio communication method according to claim 1, wherein the radio base station sets, as the plurality of subframes, a normal subframe, a subframe (ABS) to serve as a non-transmit power period, and a reduced-power ABS in which transmit power is reduced lower than in the normal subframe.

3. The radio communication method according to claim 2, wherein the radio base station defines a bit value to represent the normal subframe in the base part, and defines a bit value to represent the ABS and the reduced-power ABS in the extended part.

4. The radio communication method according to claim 3, wherein, in the table, an identifier to correspond to the normal subframe is represented by the bit value defined in the base part, and identifiers to correspond to the ABS and the reduced-power ABS are represented by a combination of the bit value defined in the base part and the bit value defined in the extended part.

5. The radio communication method according to claim 2, wherein the radio base station defines a bit value to represent a specific power ratio from a plurality of power ratios in the base part, and defines a bit value to represent another power ratio in the extended part.

6. The radio communication method according to claim 1, wherein the radio base station defines a bit value to represent a specific power ratio from a plurality of power ratios in the base part, and defines a bit value to represent another power ratio in the extended part.

7. The radio communication method according to claim 1, wherein the radio base station signals the bitmap information and the power ratio to the user terminal through a higher layer.

8. The radio communication method according to claim 1, wherein the radio base station reports the bitmap information and the power ratio to the other radio base station via an X2 interface.

9. The radio communication method according to claim 1, wherein, based on the bitmap information and the power ratio, the user terminal calculates power of the shared data channel signal in each subframe, and also generates channel quality information to feed back to the radio base station.

10. The radio communication method according to claim 1, wherein the other radio base station updates channel quality information that is fed back from a user terminal connected to the other radio base station based on the bitmap information and the power ratio.

11. A radio base station comprising:
   an ABS pattern determining section that sets at least three or more kinds of varying transmit power in a plurality of subframes;
   a power parameter determining section that determines a power ratio between a reference signal and a shared data channel signal in each subframe;
   a bitmap generating section that generates bitmap information that represents a type pattern of transmit power set in the plurality of subframes; and a transmitting/receiving section that reports the bitmap information and the power ratio to a user terminal and/or another radio base station, wherein the bitmap generating section generates the bitmap information with reference to a table in which the power ratio of each subframe and identifiers are associated with each other, and the bitmap generating section sets, as a configuration of the bitmap information, a base part that is formed with the same number of bits as the number of subframes reported using the bitmap information, and an extended part of a variable size.

12. A user terminal comprising:

a receiving section that receives, as reported from a radio base station, bitmap information, which represents transmit power that is set in a plurality of subframes constituting a radio frame, and a power ratio of a reference signal and a shared data channel signal in each subframe;

an ABS pattern/power ratio determining section that calculates power of the shared data channel signal in each subframe based on the bitmap information and the power ratio received; and a received quality measurement section that generates channel quality information to feed back to the radio base station, wherein the bitmap information consists of a base part that is formed with the same number of bits as the number of subframes reported using the bitmap information, and an extended part of a variable size.

13. A radio communication system comprising a radio base station and a user terminal that is connected with the radio base station, wherein:

the radio base station comprises:

an ABS pattern determining section that sets at least three or more kinds of varying transmit power in a plurality of subframes;

a power parameter determining section that determines a power ratio between a reference signal and a shared data channel signal in each subframe;

a bitmap generating section that generates bitmap information that represents a type pattern of transmit power set in the plurality of subframes; and a transmitting/receiving section that reports the bitmap information and the power ratio to a user terminal and/or another radio base station; and the user terminal comprises:

a receiving section that receives the bitmap information and the power ratio;

an ABS pattern/power ratio determining section that calculates power of the shared data channel signal in each subframe based on the bitmap information and the power ratio received; and a received quality measurement section that generates channel quality information to feed back to the radio base station; and wherein the bitmap information is generated with reference to a table in which the power ratio of each subframe and identifiers are associated with each other, and the bitmap generating section sets, as a configuration of the bitmap information, a base part that is formed with the same number of bits as the number of subframes reported using the bitmap information, and an extended part of a variable size.

* * * * *